May 16, 1967 M. MEKJEAN 3,320,408
HEAT STORAGE APPARATUS
Filed May 4, 1964 2 Sheets-Sheet 1

United States Patent Office 3,320,408
Patented May 16, 1967

3,320,408
HEAT STORAGE APPARATUS
Matthew Mekjean, Niagara Falls, N.Y., assignor to Hooker Chemical Corporation, Niagara Falls, N.Y., a corporation of New York
Filed May 4, 1964, Ser. No. 364,547
10 Claims. (Cl. 219—530)

This invention relates to heating apparatuses. More specifically, the invention relates to apparatuses for the storage of heat, the subsequent extraction of heat from the apparatuses, and its tranformation into condition for use in domestic and industrial applications.

A recent discovery in the heat storage art has been the use of anhydrous alkali metal hydroxide compositions as heat storage media. The alkali metal hydroxide compositions have been found to possess heat storage properties superior to previously used heat storage media. The primary advantages of such compositions lie in their high heat capacities, high heats of fusion, broad operative temperature ranges (up to about 1250 degrees Farenheit), relative inertness to heating and cooling, low vapor pressures and low fume levels. Previously used heat storage media, such as those utilizing heat of crystallization or heat of changing from one anhydrous crystalline form to another crystalline form, or materials which do not use heat of fusion, do not have the heat capacities of the alkali metal hydroxide compositions nor could they be used throughout the wide temperature range in which the alkali metal hydroxides are useful. For these and other reasons, alkali metal hydroxide compositions are particularly desirable as heat storage media.

However, because of the vast differences in physical and chemical properties and the wider temperature ranges used in alkali metal hydroxide heat storage units, containers which may have been useful for other systems often cannot be satisfactorily used with the alkali metal hydroxide compositions.

Alkali metal hydroxide compositions are normally solid up to a temperature of about 450 degrees Fahrenheit to 650 degrees Fahrenheit. In order to utilize the full storage capacity of the alkali metal hydroxides, the heat required for fusion is used, in addition to a considerable portion of the heat required to raise the temperature of the material. This means that the alkali metal hydroxide compositions will exist in both the solid range up to about 450 degrees Fahrenheit to 650 degrees Fahrenheit and the liquid range from above about 450 degrees Fahrenheit to 650 degrees Fahrenheit up to about 1250 degrees Fahrenheit during a heat storage cycle. At such wide temperature ranges, ordinary containers do not satistherefore cause severe stresses because of their extremely stresses created by uneven cooling and heating and the transformations from the liquid stage to the crystalline or solid stage.

Fused or liquid alkali metal hydroxide compositions have been found to be good heat conductors and normally do not present problems with distortion because of uneven temperatures. However, the solid alkali metal hydroxide compositions are poor conductors of heat and therefore cause severe stresses because of their extremely high adhesive strength to metals on solidifying, their poor conductivity, and because of expansion and contraction of the crystalline alkali metal hydroxide composition. Unless the container is of very heavy metal or specially constructed as described herein, the extreme stresses created by the high temperatures, poor heat conduction of the crystalline material, high adhesive strength of the solid to metals, and the crystal formation of the alkali metal hydroxide composition cause extreme distortion and deformation of the container. This distortion will eventually rupture the container and prematurely end its useful life.

In accordance with this invention, an apparatus for storing heat for subsequent recovery has been discovered. The apparatus comprises a container for a heat storage medium, said container having heating means for heating the storage medium, metallic heat conductors substantially evenly distributed within the container, said conductors displacing 5 percent to 70 percent by volume of a substantially anhydrous heat storage medium comprising a major proportion by weight of an alkali metal hydroxide.

The apparatus of this invention accomplishes several functions useful to obtain a heat storage container having a long operative life. The apparatus provides increased heat transfer in both the liquid and the solid state but primarily while in the solid state. This increased heat transfer reduces stress and eliminates distortion of the container. The size of the solid mass is reduced by subdividing it into numerous parts. This subdivision reduces stress caused by crystallization and fusion. Performance of the storage medium is perfected because of the even extraction of heat from the solid and the even replenishment of heat into the mass through the heat conductors.

The heat storage media used in this invention are alkali metal hydroxides, such as potassium, sodium, lithium, rubidium, and cesium hydroxides and mixtures thereof. The term "heat storage medium" means the composition which stores heat, e.g. a sodium or potassium hydroxide composition.

Various additives to the major proportion by weight of the alkali metal hydroxide or mixtures thereof are often employed. Such additives include the alkali metal and alkaline earth metal sulfates, phosphates, halides, carbonates, stannates, silicates, fluosilicates, fluoborates, tetraborates, metaborates, aluminates, bismuthates, borates, iodates, molybdates, tungstates, vanadates, nitrates, nitrites, manganates, permanganates, chlorates, perchlorates, persulfates, chromates, dichromates, hypochlorites, perborates, oxides, e.g. $MnO$, $SnO$, $SnO_2$, $TiO_2$, $MoO_3$, $CrO_3$, $V_2O_5$, $P_2O_5$, $WO_3$, and mixtures thereof, such as sodium carbonate, sodium sulfate, potassium sulfate, lithium carbonates, lithium iodate and the like. Although various additives may be added to the alkali metal hydroxides, the major proportion, that is, more than 50 percent by weight, will be alkali metal hydroxides.

Sodium hydroxide is normally the preferred alkali metal hydroxide used in such storage media, primarily because of its lower cost and useful physical properties. Generally, mixtures of alkali metal hydroxides with "neutral" or non-reducing compounds, when exposed to the atmosphere, do not create a corrosion problem. However, when placed in an environment which substantially excludes air, these "neutral" compositions become corrosive. For this reason it is often desirable to inhibit corrosion in a closed system by the use of additives.

Therefore, inhibitors are often included and are most desirable in a closed system such as a heat storage system. Examples of the inhibitors which are used are alkali metal chromates, dichromates, phosphates, pyrophosphates, ferrophosphorus, iron, iron containing compounds and mixtures thereof, such as potassium chromate, sodium chromate, lithium phosphate and mixtures thereof.

Molten alkali metal hydroxide heat storage apparatuses must be constructed of materials which will not dissolve under the conditions existing in the heat storage medium. It has been found that metals which would normally be expected to be suitable in such an application will not have the required durability in the present system. Metals such as stainless steel, for example, will fail after limited use. Although additives may be employed to reduce corrosion, it is preferred to use select metals which are corrosion-resistant to the alkali metal hydroxide compositions described.

Low carbon steel or mild steel such as that bearing American Iron and Steel Institute Number 1020 and lower classifications is particularly suitable in this application. Other metals of Group VIII of the Periodical Table, especially cobalt, nickel, ruthenium, rhodium, palladium, osmium, iridium and platinum and their alloys, are particularly suited as corrosion-resistant metals. The suitable metals and alloys are those which do not dissolve in the described heat storage medium and which will not act as reducing agents. These metals and their alloys are used in those parts of the container which contact the alkali metal hydroxide composition.

As a further description of corrosion-resistant metals and alloys, the following and similar compositions meet the requirements noted: nickel-steels including all percentages of nickel-iron and up to 4 percent copper; cobalt alloys containing varying percentages of nickel, iron, silica, chromium and others; nickel alloys containing varying percentages of cobalt, nickel, chromium and others; nickel alloys containing up to 80 percent copper; ferrous alloys, as chrome steel, mild steel, nickel-molybdenum steel, nickel-chromium steel; and the like. In all of the above alloys, the carbon content is below 3.0 percent and preferably below 0.3 percent by weight. Many of the preferred alloys are sold under trademarks such as Haynes Stellite Alloy Nos. 3, 6, 93 and 157 manufactured by Haynes Stellite Co., Hastelloy Alloy A, B, C, D, F and X manufactured by Haynes Stellite Co., Monel K, KR, R and S manufactured by International Nickel Co., and Spang Chalfant 1, 2 and 3 manufactured by National Supply Co. The compositions of the above alloys are further described in Metals Handbook, 1948 edition, published by The American Society for Metals, Cleveland, Ohio; in Metals Handbook, 8th edition, volumes I and II, published 1962–64, by American Society for Metals, Metals Park, Novelty, Ohio; and Chemical Engineers Handbook, 2d edition, published by McGraw-Hill Book Co., New York, 1941, pages 2108 through 2129.

Since the mentioned corrosion-resistant metals are normally not excellent conductors of heat, the internal portions or cores of the heat conductors can be fabricated from other more conductive metals having a thermal conductivity designated as λ meaning gram-calories per second times square centimeters times degrees centigrade per centimeter at a given temperature. The preferred metals are listed in Table I with their respective thermal conductivity, the higher λ values have better conductivity.

TABLE I

| Metal | Temperature, ° C. | λ |
|---|---|---|
| Aluminum | 600 | 1.01 |
|  | 400 | 0.76 |
|  | 100 | 0.49 |
| Copper | 100 | 0.92 |
| Silver | 400 | 0.9919 |
| Gold | 97 | 0.976 |
| Tungsten | 0 | 0.383 |
|  | 2,227 | 0.354 |
| Magnesium | 0–100 | 0.376 |
| Molybdenum | 17 | 0.34 |
| Red Brass | 100 | 0.283 |
| Yellow Brass | 100 | 0.254 |
| Cadmium | 100 | 0.2045 |
| Copper-zinc alloys | (*) | 0.26–0.30 |
| Palladium | 100 | 0.182 |
| Nickel | 18 | 0.14 |
| Nickel-cobalt alloys | 500 | 0.104 |
| Iron (low carbon) |  | 0.14 |

*Below their M.P.

Since many of these metals are not corrosion-resistant, it is preferred to clothe, sheath, plate or coat the less corrosion-resistant metals with one of the more corrosion-resistant metals described.

The conductors may be solid bars, strips, coils, loops, spirals, etc. of any design which occupy an internal portion of the container and contact the external walls of the container. In addition, the heat conductors may be tubular, permitting the passage of air or liquids therethrough.

The designs of the metal conductors which occupy the internal portion of the alkali metal hydroxide composition container are not critical. It has been found, however, that it is preferred that the metal conductors be sufficient in size, number and volume so as to displace between 5 percent and 70 percent by volume of the alkali metal hydroxide composition, measured at the fusion temperature, which would normally occupy a container of similar size.

The exterior walls of the container are preferably constructed of steel having an American Iron and Steel Institute Number of 1020 or lower, nickel, or a corrosion resistant alloy as previously described. The AISI Number 1020 refers to a low carbon or mild steel. Containers fabricated from mild steel are most preferred because of their lower cost compared to other previously named metals, their ease of fabrication, availability and desirable use properties.

The size and shape of the container, also known as a module enclosure or reservoir, is not critical. It may have a capacity from a few pounds of alkali metal hydroxide composition up to several hundred or thousands of pounds. The shape may also vary and may be cubical, rectangular, triangular, cylindrical, spherical, waved or pressed with specific designs, and the like. Exterior designs having irregular shapes are more conducive to heat transfer because of the turbulence caused in passing heat transfer agents such as gases or liquids. Therefore, they may be used in preference to a smooth surface. Such designs and variations in external structural shapes are included within the scope of this disclosure.

The invention is described more fully with reference to the accompany drawings, in which.

Figure 1:
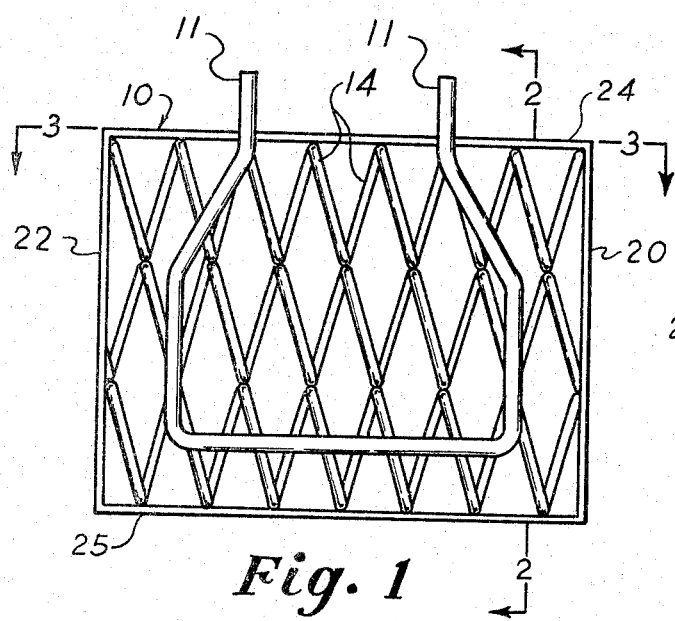
FIGURE 1 is a longitudinal sectional view of an apparatus made in accordance with the present invention.
Figure 2:
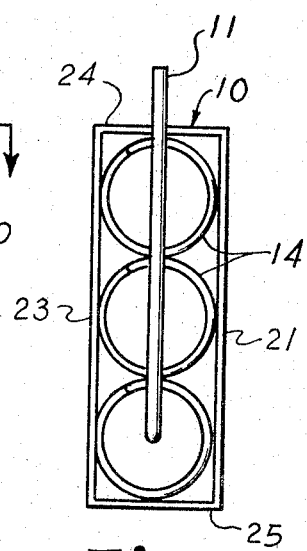
FIGURE 2 is a transverse sectional view of the apparatus of FIGURE 1 along 2—2.
Figure 3:
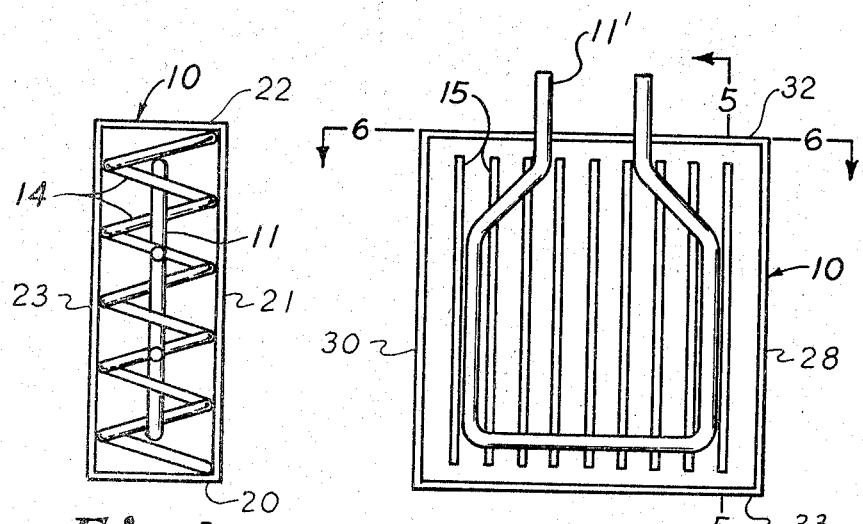
FIGURE 3 is a top plan view of the apparatus of FIGURE 1.

The embodiment illustrated in FIGURES 1, 2 and 3 shows a rectangular shaped container 10 having metallic conductors 14 in the shape of coiled springs occupying the internal portion of container 10 and attached to sidewalls 20, 21, 22 and 23, top wall 24 and bottom wall 25 thereof. Heating means 11 located within container 10, periodically heat container 10 and the composition contained therein. The heat delivered by heating means 11 is obtained from any convenient source or fuel such as electricity, solar energy, gas, oil, coke or coal. Conductors 14 equalize the heat throughout container 10 in addition to conveying heat to side walls 20, 21, 22 and 23, top wall 24 and bottom wall 25. Heat conveyed to the walls is subsequently transferred to gases or liquids passed over and around the container surfaces. The transferred heat is ultimately consumed in various manners.

Figure 4:
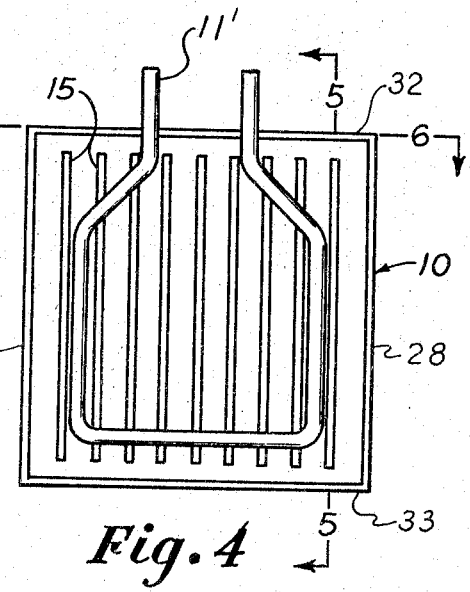
FIGURE 4 is a longitudinal sectional view of another apparatus made in accordance with this invention.
Figure 5:
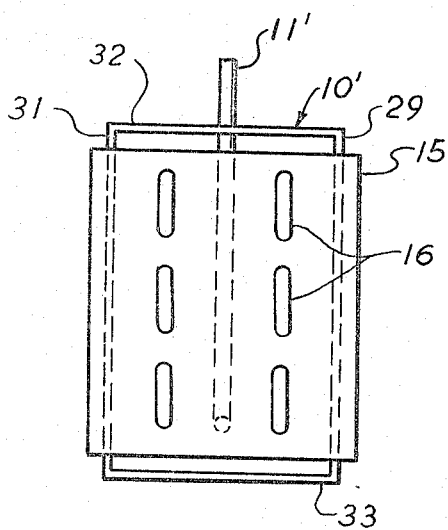
FIGURE 5 is a transverse sectional view of the apparatus of FIGURE 4 along 5—5.
Figure 6:
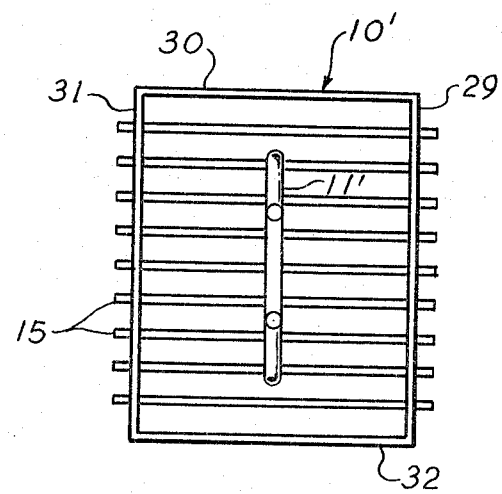
FIGURE 6 is a top plan view of the apparatus of FIGURE 4.

The embodiment illustrated in FIGURES 4, 5 and 6 is container 10' having heat conductors 15 in a spaced relationship to each other distributed throughout container 10′. Also located within container 10′ is heating means 11′ which supplies heat to container 10′ and the alkali metal hydroxide as previously described. Metallic conductors 15 preferably have openings or perforations 16 therein, permitting free flow of liquids within the container. Container 10′ has side walls 28, 29, 30 and 31, bottom wall 33 and top wall 32. Heat conductors 15 extend beyond side walls 29 and 31. These extensions are conducive to increased heat transfer to gases or liquids which are passed thereover to extract heat.

Figure 7:
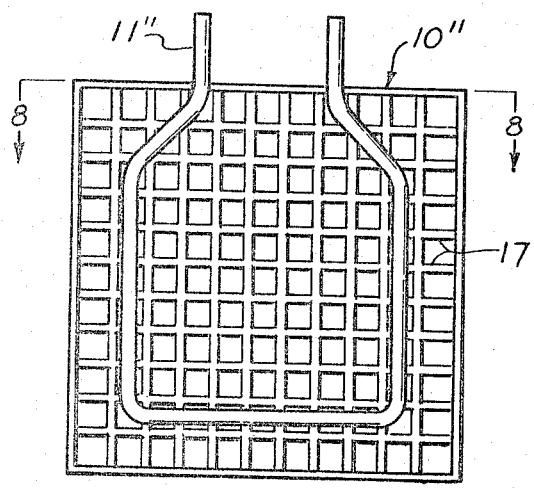
FIGURE 7 is a longitudinal sectional view of another apparatus made in accordance with the present invention.
Figure 8:
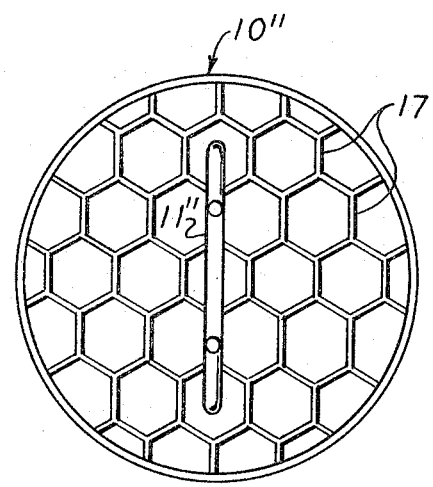
FIGURE 8 is a top plan view of the apparatus of FIGURE 7.

The embodiment illustrated in FIGURES 7 and 8 is another container 10″ in cylindrical configuration. Metallic conductors 17 having an open hexagon shape permitting free movement of the liquid heat storage composition are distributed throughout the interior of container 10″. Again heating means 11″ is shown in a centralized position. In the cylindrical structure provided in this embodiment, it is particularly important that good heat transfer is maintained both in the heat absorption phase and in the subsequent heat discharge phase. Without metallic conductors 17 or similar metallic conductors as described herein, stresses created in heating and cooling could rapidly distort and rupture container 10″. In addition, a single heating means would produce uneven heating without a conducting means to dissipate heat as provided.

As has been noted, the present apparatus is useful as a container for heat storage media. It is useful as a container for alkali metal hydroxide compositions used as heat storage media. The heat storage containers and media of this invention are particularly useful for the storage of heat which is obtained periodically such as solar energy converted to heat or electrical heat. Many power companies offer special low rates for off peak hours electrical energy. The heat storage system provides a means for taking advantage of the lower rates and utilizing off-peak power, and because of its efficiency, results in a lower cost heat supply. The heat absorbed by the storage medium may be subsequently used for home heating, hot water heating and various other domestic applications as well as industrial applications such as the production of steam and various other uses to which such a heat supply can be applied. In most situations, the heat storage container and medium will be located at a distance from the actual end use. Therefore, heat transfer is effected form the medium through the container or module wall to a gas or liquid in contact therewith and passing over the walls, which conveys the heat to the area of its ultimate use.

While there have been described various embodiments of the invention, the apparatus and methods described are not intended to limit the scope of the invention, as it is realized that changes therein are possible within the invention. It is further intended that each element recited in any of the following claims is to be understood as referring to all equivalent elements for accomplishing substantially the same results in substantially the same or equivalent manner. It is intended to cover the invention broadly, in whatever form its principle may be utilized.

What is claimed is:

1. A heat storage apparatus comprising a mild steel container for a heat storage medium, a heat storage medium, electrical heating means within the container for heating said heat storage medium, rigid metallic heat conductors distributed in a spaced relationship to each other within said container in contact with said heat storage medium, said heat storage comprising a major proportion by weight of a substantially anhydrous sodium hydroxide composition containing a corrosion inhibitor and wherein said metallic conductors are of mild steel contacting at least two opposed side walls of said container and displacing from said container 5 to 70 percent by volume of said heat storage medium.

2. A heat storage apparatus comprising a container, a heat storage medium, heating means within said heat storage container for heating the heat storage medium, rigid metallic heat conductors distributed within the container contacting at least two opposed positions on the container walls, said conductors being in contact with said heat storage medium and displacing 5 to 70 percent of the container volume of said heat storage medium, said container being substantially filled with said heat storage medium comprising a major proportion of weight of a substantially anhydrous alkali metal hydroxide composition.

3. The apparatus of claim 2 wherein the metallic container and metallic heat conductors are fabricated from mild steel.

4. The apparatus of claim 2 wherein the metallic container and metallic heat conductors are fabricated from nickel.

5. The apparatus of claim 2 wherein the heat conductors extend beyond the external wall of the container.

6. The apparatus of claim 2 wherein the metallic heat conductors have a core comprised of heat conductive metal sheathed with a corrosion-resistant metal.

7. The apparatus of claim 2 wherein the heat conductors are substantially evenly distributed throughout the heat storage medium.

8. The apparatus of claim 2, wherein the alkali metal hydroxide is sodium hydroxide.

9. The apparatus of claim 2, wherein the alkali metal hydroxide composition contains a corrosion inhibitor.

10. The apparatus of claim 9, wherein the corrosion inhibitor is selected from the group consisting of iron, iron-containing compounds and alkali metal chromates, dichromates, phosphates, pyrophosphates ferrophosphorus and mixtures thereof.

References Cited by the Examiner

UNITED STATES PATENTS

| | | | |
|---|---|---|---|
| 1,412,717 | 4/1922 | Stowell | 126—400 |
| 1,802,695 | 4/1931 | Bennett | 165—133 |
| 2,518,483 | 8/1950 | Mapes. | |
| 2,640,478 | 2/1953 | Flournoy. | |
| 2,677,367 | 5/1954 | Telkes. | |
| 2,677,664 | 5/1954 | Telkes | 126—400 X |
| 2,808,494 | 10/1957 | Telkes | 126—400 X |
| 2,911,513 | 11/1959 | MacCracken | 126—375 X |
| 2,915,397 | 12/1959 | Telkes. | |
| 2,936,741 | 5/1960 | Telkes | 126—400 X |
| 3,029,596 | 4/1962 | Hanold et al. | |
| 3,148,676 | 9/1964 | Truog et al. | 126—400 X |

FOREIGN PATENTS

| | | |
|---|---|---|
| 196,697 | 3/1958 | Austria. |
| 471,505 | 12/1935 | Great Britain. |
| 546,118 | 6/1942 | Great Britain. |

FREDERICK L. MATTESON, JR., *Primary Examiner.*

ROBERT A. DUA, *Assistant Examiner.*

UNITED STATES PATENT OFFICE
CERTIFICATE OF CORRECTION

Patent No. 3,320,408                                            May 16, 1967

Matthew Mekjean

It is hereby certified that error appears in the above numbered patent requiring correction and that the said Letters Patent should read as corrected below.

Column 1, line 10, "specificially" should read -- specifically --; line 12, "tranformation" should read -- transformation --; line 52, cancel "therefore cause severe stresses because of their extremely" and insert -- factorily withstand, over a period of time, the extreme --. Column 3, TABLE I, second column, line 5 thereof, "400" should read -- 100 --. Column 4, line 38, "accompany" should read -- accompanying --. Column 5, line 46, "form" should read -- from --. Column 6, line 2, "storage" should read -- storage medium --.

Signed and sealed this 11th day of November 1969.

(SEAL)
Attest:

EDWARD M. FLETCHER, JR.                        WILLIAM E. SCHUYLER, JR.
Attesting Officer                                   Commissioner of Patents